(12) United States Patent
Demidov

(10) Patent No.: US 11,893,441 B2
(45) Date of Patent: Feb. 6, 2024

(54) RADIO FREQUENCY IDENTIFICATION FLAT SHEET MATERIAL

(71) Applicant: Ivan Sergeevich Demidov, Zelenograd (RU)

(72) Inventor: Ivan Sergeevich Demidov, Zelenograd (RU)

(73) Assignee: RFID PAPER SDN BHD, Johor Bahru (MY)

( * ) Notice: Subject to any disclaimer, the term of this patent is extended or adjusted under 35 U.S.C. 154(b) by 0 days.

(21) Appl. No.: 17/618,290

(22) PCT Filed: Sep. 20, 2019

(86) PCT No.: PCT/RU2019/000659
§ 371 (c)(1),
(2) Date: Dec. 10, 2021

(87) PCT Pub. No.: WO2020/251394
PCT Pub. Date: Dec. 17, 2020

(65) Prior Publication Data
US 2022/0309310 A1    Sep. 29, 2022

(30) Foreign Application Priority Data

Jun. 14, 2019 (RU) ................................ 2019118582

(51) Int. Cl.
*G06K 19/077* (2006.01)
*B32B 29/00* (2006.01)
(Continued)

(52) U.S. Cl.
CPC ...... *G06K 19/07722* (2013.01); *B32B 29/002* (2013.01); *B32B 38/0004* (2013.01);
(Continued)

(58) Field of Classification Search
CPC ............................................... G06K 19/07722
(Continued)

(56) References Cited

U.S. PATENT DOCUMENTS 8,282,007 B1 * 10/2012 Cloutier ........... G06K 19/07745
235/492
9,626,617 B2 4/2017 Martin et al.
(Continued)

FOREIGN PATENT DOCUMENTS

JP    S59140585 A    8/1984
RU    98405 U1    10/2010
(Continued)

*Primary Examiner* — Rafferty D Kelly
(74) *Attorney, Agent, or Firm* — Maschoff Brennan

(57) ABSTRACT

The invention relates to the field of radio-frequency identification, in particular, to materials containing radio-frequency tags in their layers and intended for printing and stamping by commonly available printing methods. The technical result of the invention is to obtain the flexible flat sheet material in which the chips and other electronic components do not affect the level of the sheet material surface flatness. The flat sheet material with radio frequency identification contains the sequentially arranged first layer of flexible material, the first intermediate layer, the substrate layer with an antenna and a chip, the second intermediate layer, the second layer of flexible material, and the first intermediate layer made of the polymer composite.

20 Claims, 2 Drawing Sheets

Figure 1:
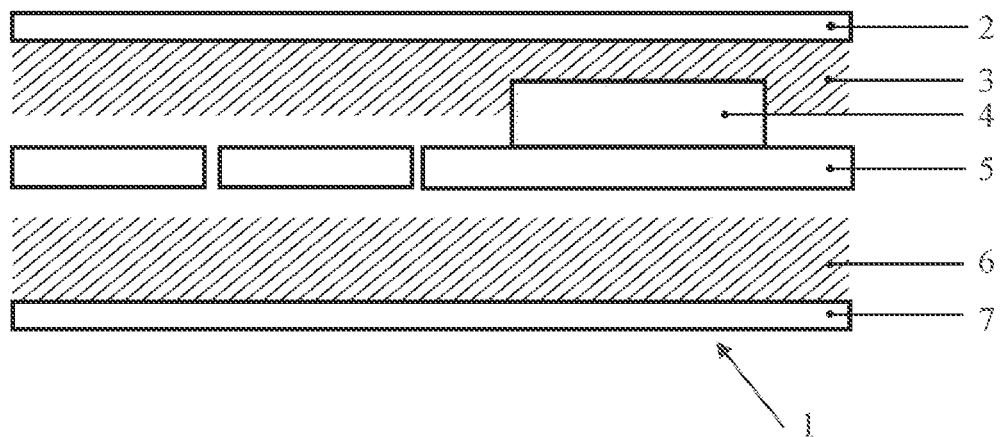

(51) Int. Cl.
*B32B 38/00* (2006.01)
*G06K 19/02* (2006.01)
*G06K 19/07* (2006.01)

(52) U.S. Cl.
CPC ....... *G06K 19/025* (2013.01); *G06K 19/0723* (2013.01); *G06K 19/07705* (2013.01); *G06K 19/07718* (2013.01); *G06K 19/07775* (2013.01); *B32B 2519/02* (2013.01)

(58) Field of Classification Search
USPC ........................................................ 235/488
See application file for complete search history.

(56) References Cited

U.S. PATENT DOCUMENTS

2012/0104102 A1* 5/2012 Rancien ............... G06K 19/025
 235/488
2014/0322500 A1* 10/2014 Depres .................... B41M 1/22
 156/247

FOREIGN PATENT DOCUMENTS

| WO | 2009071068 A2 | 6/2009 |
| WO | 2010007287 A1 | 1/2010 |
| WO | 2017010014 A1 | 1/2017 |

* cited by examiner

RADIO FREQUENCY IDENTIFICATION FLAT SHEET MATERIAL

The invention relates to the field of radio frequency identification, in particular, to materials containing the radio frequency labels in its layers and intended for printing and stamping by commonly available printing methods.

The following terms and abbreviations will be used hereinafter.

Radio frequency identification (abbr. RFID) is a method of transmitting wireless information in which the data stored in so-called transponders or RFID tags by means of radio signals are read or written. Generally, the RFID tags are passive, in other words, they do not include batteries.

Chip—an integrated (micro)circuit is a microelectronic device with input resistances and/or building networks made of the semiconductor plate. The chip processes signals when receiving and transmitting information by means of the radio frequency communication with a reader. The processor contains a protected memory, user memory, a unique identification number. The processor may contain a processor for cryptography processing, programmable space to run microprograms, etc.

The antenna is a conductor configuration, which geometrically and technically is made in accordance with the type of chip used. The antenna can be closed (HF range) and open type (UHF range). The antenna comes in different shapes: the circle, oval, square, rectangle, and other free geometric shapes. The antenna's shape is designed in accordance with the specification of the chip used. The antenna is made of materials containing conductive substances, such as aluminum, copper, silver, tin, gold, graphite, and other materials. The antenna is to be applied on the substrate made of thin-film, synthetic materials, and paper by etching, silk screen printing (screen printing), thermal transfer, stamping, inkjet, offset, as well as flexographic and digital printing with special inks.

The RFID inlay is a part of the RFID product that consists of the substrate and contains at least one chip and one antenna. The location of the antennas and chips can be either synchronous relative to the sides of the sheet material with the radiofrequency tag or asynchronous, depending on the intended design and configuration of the future RFID product. The additional components can be located on the inlay, for example, capacitors, resistors, sensors, microcontrollers, etc.

The RFID tag is a combination of the chip and antenna.

The RFID product is a final product, containing an RFID tag, for example, a card, tag, label, sticker, packaging, bracelet, or other forms of the product that can be obtained by cutting it from the sheet of RFID material that includes an RFID inlay.

The RFID reader is a device designed to exchange data with RFID products, for example, information reading and writing.

The polymer composite is a composite material whose matrix is formed of polymers or elastomers.

Bulking paper, so-called raw paper, that has not been processed by a calendaring press, for example, with a puffiness factor of more than 1.30, is traditionally used in order to obtain a sufficiently flat surface of the material with the RFID tag. In such paper, the chip is pressed using external pressure to ensure an acceptable material surface flatness.

This method exposes the chip to significant pressure, which affects the occurrence of crystal deformations and the possible failure of the chip. It's also possible that hidden defects appear, whose occurrence cannot be identified in the production process. The thickness of the bulking paper should be enough to create a chip pocket. Bulking paper is usually more expensive, as it is a rare material on the printing market. Bulking paper is limited in choice and printing method. The chip can become detached from this structure as time goes by, especially if storage climatic conditions change. This method limits the range of surface materials used.

The closest analog of the claimed invention is a sheet material with radio frequency identification, it is known from patent JP 5916028. The material has a paper-like structure in which the RFID tag is placed between the first paper layer and the second paper layer. The material is equipped with a slot that corresponds to the RFID chip. What's more, the height of the protective material upper surface is greater than the height of the RFID chip's upper surface.

However, patent JP 5916028 has disadvantages. The additional layer is required for manufacturing material in which holes that match the arrangement of the chips on the RFID inlay are arranged beforehand, the geometric size of the hole should be close to the size of the chip, and the thickness of this layer should correspond to the height of the chip. High-precision rotor equipment is required for combining when the alignment of the chip geometric dimensions—the change of equipment rigging. The presence of this layer increases the cost of production, complicates the production process, and reduces flexibility when changing the RFID inlay layout.

The technical problem the claimed invention aims to solve is to create a sheet material incorporating radio frequency identification with a surface that is sufficiently flat on both sides of the sheet for simple typographical printing, and the method of manufacturing of such a material is simple and cost-effective. It is not necessary to change the manufacturing process when changing the RFID inlay layout.

The technical result of the invention is to obtain the flexible flat sheet material in which the chips and other electronic components do not affect the level of the sheet material surface flatness.

The claimed material manufacturing does not impose special requirements and does not require the additional adaptation of its layers. The outer surface of the material is flat and smooth, regardless of the chip height or the electronic components used or their configuration on the inlay. The surface does not change over time.

The use of the claimed invention allows to simplify and accelerate the production of sheet materials suitable for printing on both sides and containing the RFID and other electronic components in its composition.

The inventive material provides the printing in various printing methods: offset printing, silk screen printing, inkjet, or digital printing. The material's flexibility and elasticity allow it to pass freely along the path of the printing presses, like conventional paper. The material does not change its plane-parallelism after heating up in printing equipment and during storage. The paint lays without any flaws at the location of the chips and electronic components.

This result is achieved due to the fact that the material contains a polymer film, which is finally formed in its geometry, taking into account all protruding elements, for example, the chip on the surface of the inlay, on both its sides. The polymer film is fixed on one or both sides of the RFID inlay.

This polymer film is formed when producing the sheet material from the polymer composite in one technological operation. The polymer composite is applied in a liquid state that makes it possible to cover the protruding RFID elements of the inlay, flowing around them. The polymer film can be formed on both sides of the inlay, including if additional electronic components are available on the rear side of the inlay. The polymer composite also has adhesive properties that make it possible to reliably glue together two adjacent materials.

This polymer film is an excellent dielectric and it can freely contact the RFID chip and antenna, electronic components, and conductive tracks, which also makes it possible to ensure the use of the product in a humid environment. The polymer film has the property of the elastomer, it has extensive operating temperature ranges, from −60 to +120° C., without losing its technical characteristics, which allows it to be used in the digital printing machines that expose the material to heat. Due to this, the materials are not changed due to the impact of thermal or mechanical influences, if necessary, for example, the material can be bent, but it always returns to its original shape afterward.

The polyurethane-based polymer film does not change its properties over time, it does not change its color, and it is protected against UV rays. The color of the formed polymer film can be transparent or any other by adding coloring agents.

The chip and other electronic products inside the material are reliably protected from mechanical stress as they are completely positioned inside the formed polymer film, which significantly increases the product life and mechanical stability during operation.

The claimed technical result is achieved due to the fact that the flat sheet material with radio frequency identification contains the sequentially arranged first layer of flexible material, the first intermediate layer, the substrate layer with an antenna and a chip, the second intermediate layer, the second layer of the flexible material, what's more, the first intermediate layer is made of polymer composite.

Figure 2:
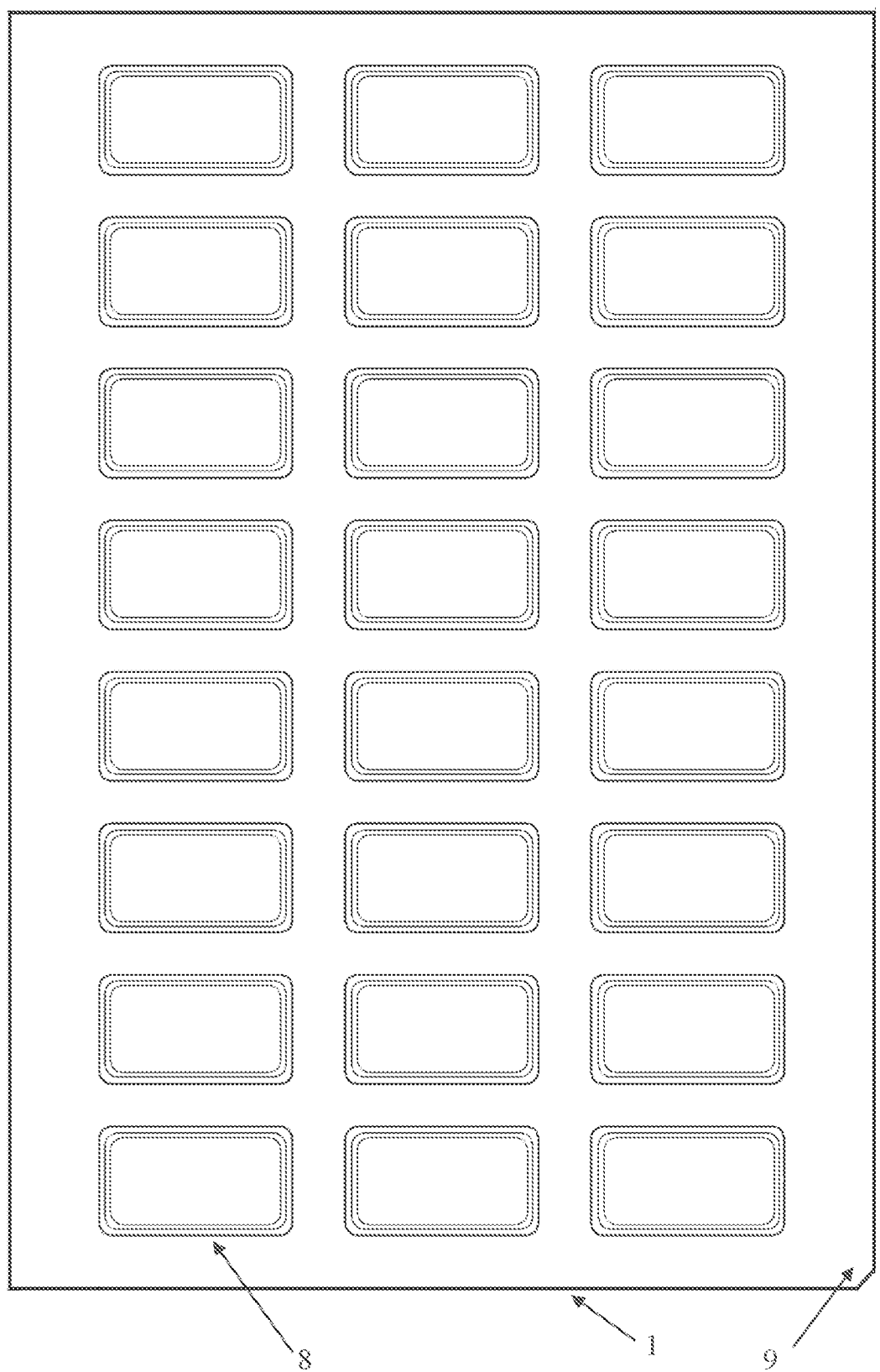

The invention is explained using FIGS. 1-2, which shows: FIG. 2 is a general view of sheet material with twenty-four radio frequency tags; FIG. 1 — sheet material sectional view.

Positions 1-9 are showing in FIG. 1-2:
1—sheet material;
2—the first layer of the flexible material;
3—the first intermediate layer of the polymer composite;
4—chip;
5—the layer substrate with the antenna and chip;
6—the second intermediate layer;
7—the second layer of the flexible material;
8—antenna;
9—beveled corner.

Flat sheet material 1 with the radio-frequency identification contains the sequentially arranged first layer 2 of flexible material, the first intermediate layer of polymer composite 3, the substrate layer 5 with antenna 8 and chip 4, the second intermediate layer 6, the second layer of flexible material 7.

The device has a sandwich structure (FIG. 1).

The first 2 and the second 7 layers of flexible material are printing layers.

The first 2 and the second 7 layers of flexible material can be made of offset, craft, or recycled paper; cardboard; synthetic paper, can be made of PET (Polyethylene Terephthalate), PVC (Polyvinyl Chloride), PP (Polypropylene), PE (Polyethylene), natural or synthetic fabric, artificial leather based on PVC (Polyvinyl chloride) or PU (Polyurethane), or a layer of another suitable material. The flexible material can be either white or painted in any color, it should have markings, patterns or inscriptions, textured surface or additional coating, including the primer that retains surface paint better, and it should contain metalized layers, magnet layers, metal chips, and other materials.

The flat sheet material with radio frequency identification can have the first 2 and second 7 layers of various flexible material, the front and back sides made of one or different grades and colors of paper, or contain the paper on one side and synthetic material on the other side, fabric, or have a siliconized layer on one side and other combinations, including those containing the metallized layers, magnetic layers, and other materials.

The polymer composite from the group of polyurethanes (polyester-polyols) is used as a polymer composite.

The first 3 and second 6 intermediate layers can be made of the same material or have different properties. For example, the second intermediate layer 6 may possess residual adhesive properties, in which case it is possible to get the label in combination with the second layer of flexible material 7 coated with silicone.

The substrate 5 may be made, for example, of PET, special paper, or another suitable flexible material.

Antenna 8 can be made by etching or sputtering of aluminum, alloys based on copper, silver, gold, graphite, or any other conductive material suitable for chip 4's operation.

Antenna 8, in particular, has a rectangular shape (FIG. 2). More than one antenna with a chip, depending on the purpose, can be integrated into the sheet. Twenty-four RFID tags, which respectively contain twenty-four antennas on the substrate, are shown in FIG. 2.

The sheet material can be made in the form of standard sizes rectangular sheet: A4 size 210 mm by 297 mm, SRA3 size 320 mm by 460 mm, SRA3+ size 325 mm by 480 mm, SRA2+ size 520 mm by 720 mm, in the form of a roll with a width from 210 mm up to 850 mm, and other sizes.

The sheet material can be made in the form of a rectangular sheet, in which one of the corners is geometrically different from three others, for example, it has a 45° bevel recess.

The beveled corner is a positional angle for the sheet material, it ensures the correct location of the sheet at various stages of manufacturing the finished product by printing plants: stamping and die-cutting. The positional angle, in contrast to the graphically plotted angle, is more convenient, since it makes it possible to check the correct location of the sheet in the middle of the stack.

LEDs, sensors, transducers, thin-film batteries, and other electronic components can also be placed inside the sheet.

The positional elements can be located inside the sheet, whereby the induction sensors find the location of the RFID tags to position the sheet during printing, cutting, or other necessary operations in punching and other printing machines.

The resulting sheet thickness varies from 0.15 mm to 5.0 mm.

The machine-readable unique sheet number can be applied on each sheet, for example, the barcode, QR code, and other graphic elements. The tags located on the RFID sheet are linked by this number. The unique numbers of the RFID tags, located inside the sheet material are known in advance for printing plant, when the print file generating by the printing plant, that allows to print this information in one go, thereby avoiding the additional manipulations for reading data from RFID tags and its subsequent additional application of graphics on the RFID product.

After printing, the sheet material with radio frequency identification can be further processed, for example, partial foil stamping, varnishing, application of laminating films based on BOPP (biaxially oriented polypropylene film), PVC, PET.

The sheet material is made as follows.

The first intermediate layer 3 of the polymer composite is applied in liquid form with a viscosity of 500 to 20,000 mPA/s (millipascals per second), and a thickness of 0.01 mm to 3 mm between the first layer 2 of flexible material and substrate layer 5 with antenna 8 and chip 4. Then, the second intermediate layer 6 of the polymer composite is applied in liquid form with a thickness of 0.01 mm to 3 mm and a viscosity of 500 to 20,000 mPA/s (millipascals per second), between the second layer 7 of flexible material and the layer of substrate 5 with antenna 8 and chip 4, if necessary. Glue may be applied instead of the polymer composite.

The material passes through the system of presses, which allows you to fix the thickness of the material at the outlet and detect the recesses in the liquid polymer composite from the protruding components. The deposited polymer composite goes through the polymerization stage and becomes a polymer film in this state.

The thickness of the polymer composite deposition is selected empirically, depending on the materials used, the properties of spreading over the surface, the height of the electronic components, and other factors.

The viscosity depends on the technical properties of the polymer composite used and the application temperature. It is selected empirically and usually ranges from 500 to 20,000 mPA/s (millipascals per second). The polymer composite material can be three-component, two-component, and one-component type.

The high-strength polymer film is formed after polymerizing the polymer composite, which is no longer subjected to geometric changes, even during heating, thereby the pressure of the chip and electronic components on the substrate does not appear on the first 2 and second 7 layers of the flexible material, since the formed polymer film starts to compensate its height. The material is flat and flexible, which provides a flat surface suitable for printing on both sides.

The stated sheet material can be used to produce classic products with RFID tags and other electronic components in the form of labels, tags, postcards, stickers, boxes, RFID cards, NFC business cards, and other similar products.

The feature of the invented material is its flat surface and elasticity for typographical printing.

The second feature is that the formed polymer film in the composition of the sheet material does not pass oxygen, which makes it possible to use the resulting material in manufacturing the packages with radio frequency identification for food products.

The invention claimed is:

1. A flat sheet material for radio frequency identification (RFID), comprising:
   a first layer of flexible material,
   a first intermediate layer on top of the first layer of flexible material,
   a substrate layer on top of the first intermediate layer, the substrate layer comprising an antenna, a chip being mounted on the antenna,
   a second intermediate layer on top of the substrate layer, the second intermediate layer encapsulating the chip, and
   a second layer of flexible material on top of the second intermediate layer,
   wherein the first intermediate layer is made of a polymer composite, and wherein the second intermediate layer is formed by applying the polymer composite in a liquid form between the substrate layer and the second layer of flexible material to cover protruding elements of the substrate layer, and allowing the polymer composite in the liquid state to polymerize.

2. The flat sheet material of claim 1, wherein the first intermediate layer is made of a polymer composite, and wherein the first intermediate layer is formed by applying the polymer composite in a liquid form between the first layer of flexible material and the substrate layer, and allowing the polymer composite in the liquid state to polymerize.

3. The flat sheet material of claim 1, wherein the second intermediate layer has adhesive properties.

4. The flat sheet material of claim 1, wherein the flexible material is selected from paper, a non-woven fabirc, a polymeric film and cloth.

5. The flat sheet material of claim 1, wherein the flat sheet material comprises a plurality of RFID tags, wherein the flat sheet material is rectangular, and wherein the rectangular flat sheet has a bevel having a 45° angle formed on one corner of the sheet.

6. A method for manufacturing an RFID product, comprising:
   mounting the flat sheet material as defined in claim 5 into a printer, the bevel formed on the one corner of the sheet being used for proper positioning of the sheet material in the printer.

7. The flat sheet material of claim 1, wherein the flat sheet material has a size selected from 210 mm by 297 mm, 320 mm by 460 mm, 325 mm by 480 mm and 520 mm by 720 mm, and 210 mm to 750 mm.

8. The flat sheet material of claim 1, wherein the flat sheet material includes a layer of polymeric film over the first and second layers of flexible material.

9. The flat sheet material of claim 1, wherein the flat sheet material includes additional electronic components, and wherein the one or more additional electronic compoents are selected from light emitting diodes (LEDs), sensors, transducers, thin-film batteries, capacitors, resistors, microcontrollers, and any combination thereof.

10. The flat sheet of claim 1, wherein one or both of the first intermediate layer and the second intermediate layer are made as nontransparent or colored.

11. The flat sheet material of claim 1, wherein a RFID product manufactured from the sheet material is selected from a card, a tag, a label, a sticker, a packaging and a bracelet.

12. The flat sheet material of claim 1, wherein each of the first and second layers of flexible material is selected from offset paper, craft paper, recycled paper, cardboard, synthetic paper, Polyethylene terephthalate, Polyvinyl chloride, Polypropylene, Polyethylene, natural fabric, synthetic fabric, and a combination thereof.

13. The flat sheet material of claim 1, wherein a RFID product manufactured from the sheet material includes the chip and more than one antenna.

14. The flat sheet material of claim 1, wherein a plurality of RFID products are manufactured from the sheet material, each RFID product including the chip and at least one antenna.

15. The flat sheet material of claim 1, further comprising a plurality of positional elements located inside the sheet, the positional elements being usable for locating a plurality of RFID products during an operation selected from printing, cutting and punching of the sheet material.

16. The flat sheet material of claim 15, wherein a thickness of the sheet material varies between 0.15 mm and 5.0 mm according to locations of the plurality of positional elements.

17. The flat sheet material of claim 1, wherein:
 a machine-readable bar code, QR code or graphic element is printed on the sheet material; and
 one or more RFID product manufactured from the sheet material is identified by the machine-readable bar code, QR code or graphic element.

18. The flat sheet material of claim 1, wherein one or both of the first intermediate layer and the second intermediate layer comprises a polyurethane-base polymer composite.

19. The flat sheet material of claim 1, wherein one or both of the first intermediate layer and the second intermediate layer have elastomeric properties.

20. A flat sheet material comprising a plurality of radio frequency identification (RFID) tags, the flat sheet material comprising:
 a first layer of flexible material;
 a first intermediate layer on top of the first layer of flexible material;
 a substrate layer on top of the first intermediate layer, wherein the substrate layer comprises a plurality of antennae and a plurality of chips, and wherein each chip is mounted on the antenna;
 a second intermediate layer on top of the substrate layer, the second intermediate layer encapulating the plurality of chips; and
 a second layer of flexible material on top of the second intermediate layer,
 wherein the second intermediate layer is formed by applying a polymer composite in a liquid form between the substrate and the second layer of flexible material to cover protruding elements of the substrate layer, and allowing the polymer composite in the liquid state to polymerize.

* * * * *